S. H. FOLSOM.
Hoes.

No. 133,932.

Patented Dec. 17, 1872.

WITNESSES.

INVENTOR.

Samuel H. Folsom

AM. PHOTO-LITHOGRAPHIC CO. N.Y. (OSBORNE'S PROCESS.)

UNITED STATES PATENT OFFICE.

SAMUEL H. FOLSOM, OF WINCHESTER, MASSACHUSETTS.

IMPROVEMENT IN HOES.

Specification forming part of Letters Patent No. 132,932, dated December 17, 1872.

*To all whom it may concern:*

Be it known that I, SAMUEL H. FOLSOM, of Winchester, in the county of Middlesex and State of Massachusetts, have invented certain new and useful Improvements in Hand-Hoes, of which the following is a specification:

My invention relates to a hoe mounted on wheels, and designed to be operated by hand and to work on both sides of a row of vegetables or other growing crop at the same time; and it consists, first, in the use of an axle divided in the center of its length, and separated a sufficient distance apart to allow the plants to pass between the two parts, said two parts of the axle being connected together, so as to make them rigid and serve all the purposes of a continuous axle, by means of an arched connection, which rises above the plants, and, inclining forward, has firmly secured thereto the handle by which the hoe is operated, each of said two parts of the axle having mounted upon its outer end one of the supporting-wheels. It further consists in the use of two cutters located directly beneath the axle, and secured thereto in such a manner that they may be adjusted toward or from each other in line with the axle for the purpose of regulating the closeness of the cut to the plants, and also, to a greater or less distance from the axle, to regulate the depth of the cut. It further consists in the use, in combination with adjustable cutters for cutting the weeds, of a rake or rakes so arranged and operating in connection therewith that when the hoe is moved in one direction the rake will swing upon its bearings and pass over the earth and weeds without any effect thereon; but when the hoe is moved in an opposite direction the rake will be held in a rigid perpendicular position, and carry all the weeds that were cut by the previous movement of the hoe to the limit of the movement of the hoe, and there leave them on the surface of the ground.

Figure 3:
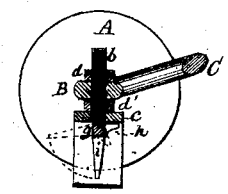
Figure 2:
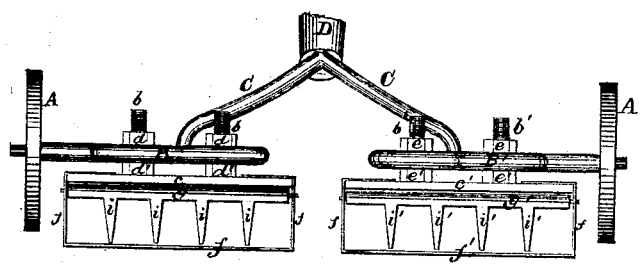
Figure 1:
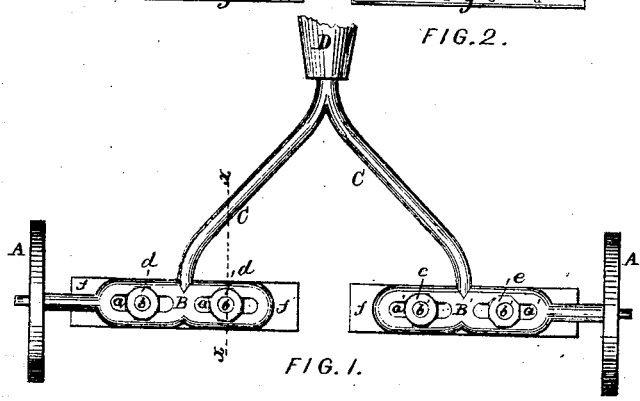

In the drawing, Figure 1 is a plan of my improved hoe; Fig. 2 is an elevation of the side opposite the handle; and Fig. 3 is a transverse section on line $x$ $x$ on Figs. 1 and 2.

In the drawing, A A are the supporting-wheels, and B and B' the two portions of the axle, each of which has mounted upon its outer end one of the wheels A A. The axles B and B' have no direct connection with each other, but instead are separated from each other a sufficient distance to allow the plants to pass between them without injury thereto; but said two portions of the axle are connected together so as to make them rigid, and, for all necessary purposes, the same as one continuous axle, by means of an arch or fork, C, rising above the plants and inclined forward so as to receive the handle D by which the hoe is operated. The two parts B and B' of the axle and the arch or fork C may be cast in one piece, or they may be cast separate and bolted together. The two parts B and B' of the axle are provided with the slots $a$ $a$ and $a'$ $a'$ to receive the shanks $b$ $b$ and $b'$ $b'$ of the cutter-heads $c$ and $c'$. The shanks $b$ $b$ and $b'$ $b'$ are provided with screw-threads and the adjusting-nuts $d$, $d'$, $e$, and $e'$, by means of which the cutter-heads may be adjusted in line with the axle to cause the cutters to work closer to or further from the plants, or in a perpendicular direction to regulate the depth to which the cutters shall work, which distance is equal to the distance the cutters $f$ and $f'$ are set below the periphery of the wheels A A. The cutters $f$ and $f'$ are made of sheet-steel or steel plate bent to the proper form and secured to the cutter-heads $c$ and $c'$, as shown. The cutters $f$ and $f'$ have their edges beveled or sharpened so as to form a cutting-edge. A rake-head, $g$ $g'$, having journals on either end, is mounted in suitable bearings formed for the purpose in the vertical portions of the cutters $f$ and $f'$ in such a manner that it is free to vibrate therein in one direction, but is prevented from rotating in the opposite direction beyond a certain point by means of the projecting lug or stop $h$. The rake-heads $g$ and $g'$ are provided with teeth $i$ $i$ and $i'$ $i'$ projecting downward therefrom nearly to the horizontal portion of the cutters $f$ and $f'$.

The operation of my improved hoe is as follows: To adjust the cutters for use the nuts $d$ and $e$ are unscrewed until the cutters $f$ and $f'$ extend below the periphery of the wheels a distance equal to the depth it is desired to cut. The cutters are then separated or moved toward each other by moving them in the direction of the length of the axle to the position required by the work to be done, where they are securely fastened by turning up the nuts $d'$ and $e'$ firmly against the lower side of the axle. By placing the hoe across the drill or row of plants so that the two parts B and B' of the axle will be upon opposite sides of the row, and moving the hoe in line with the row, the cutters $f$ and $f'$ will pass along on each side of the row, cutting the weeds on both sides at the same time with more or less closeness to the plants, according to the setting of the cutters. When the hoe is drawn toward the operator the rakes vibrate in the direction of the dotted lines in Fig. 3; but when the motion of the hoe is reversed the rakes are vibrated back to a perpendicular position, beyond which they are prevented from going by the stops $h$, which strike against the under side of the cutter-heads $c$ and $c'$; and as the hoe continues to be moved in the same direction the rakes gather the weeds and deposit them on the surface of the ground.

A cultivator may be made on the same general plan by substituting cultivator-teeth for the cutter-blades $f$ and $f'$, securing them to the cutter-heads $c$ and $c'$ so that they may be adjusted to or from the row of plants in an obvious manner.

What I claim as new, and desire to secure by Letters Patent of the United States, is as follows:

1. In a hoe or cultivator mounted on two wheels, the two axles B and B', the axes of which are in line with each other, but separated for the purpose herein set forth, and connected by the arch C rising above the plants and extending forward to receive the handle D, whether said axles and arch are cast in one piece or in separate pieces and bolted together, substantially as described.

2. In a hoe or cultivator mounted on wheels and arranged to work on both sides of the same row of plants, the cutters $f$ and $f'$ placed directly under the axle and attached thereto in such a manner that they may be readily adjusted toward or from each other in the direction of the length of the axle, and also to a greater or less distance from said axle in a vertical direction, substantially as described.

3. In combination with the cutters $f$ and $f'$, the rakes $g\ g'$, arranged and operating substantially as described, for the purpose specified.

Executed at Boston this 5th day of August, 1872.

SAMUEL H. FOLSOM.

Witnesses:
S. A. WOOD,
F. K. ROGERS.